US010618676B2

(12) United States Patent
Chen et al.

(10) Patent No.: US 10,618,676 B2
(45) Date of Patent: Apr. 14, 2020

(54) APPARATUS AND METHOD FOR LAUNCH AND RECOVERY OF AN UNMANNED AERIAL VEHICLE (71) Applicant: SINGAPORE TECHNOLOGIES AEROSPACE LTD, Singapore (SG)

(72) Inventors: Xujian Chen, Singapore (SG); Leon Choon Seng Tan, Singapore (SG); Chian Poh Lam, Singapore (SG)

(73) Assignee: ST ENGINEERING AEROSPACE LTD., Singapore (SG)

( * ) Notice: Subject to any disclaimer, the term of this patent is extended or adjusted under 35 U.S.C. 154(b) by 351 days.

(21) Appl. No.: 15/521,892

(22) PCT Filed: Nov. 27, 2014

(86) PCT No.: PCT/SG2014/000563
§ 371 (c)(1),
(2) Date: Apr. 25, 2017

(87) PCT Pub. No.: WO2016/085404
PCT Pub. Date: Jun. 2, 2016

(65) Prior Publication Data
US 2017/0320592 A1 Nov. 9, 2017

(51) Int. Cl.
*B64F 1/02* (2006.01)
*B64F 1/04* (2006.01)

(52) U.S. Cl.
CPC .................. *B64F 1/02* (2013.01); *B64F 1/04* (2013.01); *B64C 2201/021* (2013.01); *B64C 2201/08* (2013.01); *B64C 2201/082* (2013.01); *B64C 2201/182* (2013.01)

(58) Field of Classification Search
CPC .......... B64C 2201/08; B64C 2201/088; B64C 2201/182; B64F 1/02; B64F 1/04
USPC ....................................... 244/110 G
See application file for complete search history.

(56) References Cited

U.S. PATENT DOCUMENTS

| 4,311,290 | A  | * | 1/1982 | Koper | B64F 1/02 244/110 R |
| 7,066,430 | B2 | * | 6/2006 | Dennis | B64C 39/024 244/110 F |
| 7,097,137 | B2 | * | 8/2006 | McDonnell | B64C 25/68 244/110 C |
| 7,219,856 | B2 | * | 5/2007 | Watts | B64F 1/02 244/110 F |

(Continued)

FOREIGN PATENT DOCUMENTS

| DE | 4301671 A1 | * | 7/1993 | B64F 1/02 |
| GB | 2080216 A | * | 2/1982 | B64F 1/02 |
| WO | WO 01/07318 A1 | | 2/2001 | |

*Primary Examiner* — James S Bergin
(74) *Attorney, Agent, or Firm* — Christensen, Fonder, Dardi & Herbert PLLC (57) ABSTRACT

An apparatus for launch and recovery of an Unmanned Aerial Vehicle (UAV), a method for launching a UAV, a method for recovering a UAV and a kit of parts for launch and recovery of a UAV. The apparatus comprises a boom having a center member for receiving the UAV, and first and second arm members extending outwardly and upwardly from the center member, wherein the boom is configured to be lifted to a predetermined height into the air from a reference point; and wherein the boom is movable in the air to an operating position forward of the reference point.

18 Claims, 9 Drawing Sheets

(56) References Cited

U.S. PATENT DOCUMENTS

| | | | | |
|---|---|---|---|---|
| 7,264,204 | B1 | 9/2007 | Portmann | |
| 7,578,467 | B2* | 8/2009 | Goodrich | B64F 1/02 |
| | | | | 244/110 C |
| 7,954,758 | B2* | 6/2011 | McGeer | B64C 39/024 |
| | | | | 244/110 C |
| 8,028,952 | B2* | 10/2011 | Urnes, Sr. | B63B 35/50 |
| | | | | 114/261 |
| 8,172,177 | B2* | 5/2012 | Lovell | B63B 27/10 |
| | | | | 244/110 F |
| 8,276,844 | B2* | 10/2012 | Kariv | B64F 1/06 |
| | | | | 244/110 C |
| 8,453,967 | B2* | 6/2013 | Miller | B64F 1/02 |
| | | | | 244/110 C |
| 8,944,373 | B2* | 2/2015 | Dickson | B64F 1/02 |
| | | | | 244/110 C |
| 9,010,683 | B2* | 4/2015 | Gundlach | B64C 25/68 |
| | | | | 244/110 C |
| 9,434,481 | B2* | 9/2016 | McGeer | B64F 1/02 |
| 9,669,947 | B2* | 6/2017 | Zwaan | B64F 1/02 |
| 9,862,503 | B2* | 1/2018 | Chavez, Jr. | B64F 1/02 |
| 9,896,222 | B2* | 2/2018 | Kunz | B64F 1/02 |
| 2005/0017129 | A1 | 1/2005 | McDonnell | |
| 2009/0224097 | A1 | 9/2009 | Kariv | |
| 2009/0294584 | A1 | 12/2009 | Lovell et al. | |

* cited by examiner

APPARATUS AND METHOD FOR LAUNCH AND RECOVERY OF AN UNMANNED AERIAL VEHICLE

PRIORITY CLAIM

The present application is a National Phase entry of PCT Application No. PCT/SG2014/000563, filed Nov. 27, 2014, the disclosure of which is hereby incorporated by reference herein in its entirety.

FIELD OF THE INVENTION

The present invention relates broadly to apparatuses and methods for launch and recovery of Unmanned Aerial Vehicles (UAV), and more particularly but not exclusively, an apparatus and method for launch and recovery of UAVs without the use of runways.

BACKGROUND

Launching of Unmanned Aerial Vehicles (UAVs) can be achieved by pneumatic or rubber catapult means, where the launcher accelerates the UAV to flight speeds in a short time through air propulsion or the elastic energy stored in the rubber. Recovery systems of UAVs without runways typically employ parachute or airbag, where the UAV deploys the parachute or airbag to reduce the forward thrust force of the UAV and it subsequently lands in an open area. Alternatively, net-based recovery systems are widely used as well. U.S. Pat. No. 4,753,400 discloses such a net-based recovery system which captures the UAV during flight. In this system, a recovery net is attached to a parachute and coupled together with a tow line and are held together by a winch on the deck of the ship. During operation, the parachute glides the net to the desired altitude and the UAV flies towards the net and is captured. Thereafter, the recovery net and the trapped UAV are winched back onto the ship.

The presence of cross winds is not ideal to launch UAVs as they are light and winds may dislodge a UAV from its intended flight path. Therefore, large open areas are required for pneumatic or rubber catapults to launch UAVs against the unpredictable wind direction. Having a large open area is usually not possible when the launch is on a ship or in a forest. Pneumatic or rubber catapult launch methods also require a substantial amount of logistic resources because of their design and bulkiness. Although a runway is not needed for airbag or parachute deployment or recovery, a large open area (about 50 to 100 meters in diameter depending on size of UAV) is required for UAV landing due to poor landing accuracy of such a design. Similarly, there is a lack of adequate space for this method of recovery when operations are in a forest or on a ship. Even though net-based recovery systems need less space, they require precision control and are also labour intensive. In addition, the UAV approaches the net at high speed during recovery and may endanger the ship's structure and the people near the net. The impact caused by the sudden stoppage of the UAV in flight may damage the UAV as well.

An alternative launch and recovery system using a parasail is disclosed in US2005/0017129 A1. In this prior art launch system, the UAV is attached to a parasail which is tied to a towline and a winch on the ship. The parasail is then inflated and raised into the air. The winch reels out the parasail to a sufficient altitude and the UAV subsequently detaches from the parasail and free falls. The UAV will then achieve sufficient airspeed during the dive for the pilot to comfortably control it. One drawback of this system is that the parasail is disadvantageously behind the ship and the UAV may strike the ship and the towline of the parasail after detachment. Furthermore, air turbulence behind the ship's structure may cause the UAV to deviate from its intended flight path.

The recovery system of US2005/0017129 A1 uses an arrestor line held up by a lifting apparatus on a ship to capture the UAV using latching mechanisms on the UAV. This aerial recovery method induces great impact forces on the UAV as it is flying at high speeds. High energy loads on the UAV due to the abrupt stoppage may damage the UAV during recovery. This recovery system also requires precision control of the UAV to engage the latching mechanism onto the arrestor line. Furthermore, retrofitting a lifting apparatus onto a ship amounts to huge costs and logistical work.

As a consequence, there is a need for a UAV launch and recovery system that seeks to address at least some of the above problems or provide a useful alternative.

SUMMARY

According to a first aspect of the present invention, there is provided an apparatus for launch and recovery of an Unmanned Aerial Vehicle (UAV), the apparatus comprising:
  a boom having a center member for receiving the UAV, and first and second arm members extending outwardly and upwardly from the center member,
  wherein the center member comprises a capturing mechanism for aerial recovery of the UAV;
  wherein the boom is configured to be lifted to a predetermined height into the air from a reference point; and
  wherein the boom is movable in the air to an operating position forward of the reference point.

The center member may comprise a releasable fastener for attaching the UAV to the boom and releasing the UAV for aerial launch.

The center member may further comprise a capturing mechanism for aerial recovery of the UAV.

The capturing mechanism may comprise a latch configured to receive a line attached to the UAV.

The latch may comprise a biasing member configured to retain the line within the latch.

The apparatus may further comprise first and second visual indicators attached to respective ends of the first and second arm members.

Each visual indicator may be rotatable about the respective end for aligning the visual indicator with a wind direction.

The center member and first and second arm members may form a shape selected from a group consisting of a V-shape, a U-shape, a curve, and an arc.

The apparatus may further comprise lifting means attached to the first and second arm members for lifting the UAV to the predetermined height.

The lifting means may comprise lighter-than-air balloons.

The apparatus may further comprise a towline configured to be attached to the boom at one end and to the reference point at the other end for restraining the UAV to the reference point.

The apparatus may further comprise a winch is disposed at the reference point for releasing or retracting the towline.

According to a second aspect of the present invention, there is provided a method for launching a UAV, the method comprising the steps of:

attaching the UAV to the boom of the apparatus as defined in the first aspect;

lifting the boom to the predetermined height;

starting an engine of the UAV for moving the UAV to the operating position forward of the reference point; and detaching the UAV from the boom.

The step of lifting the boom to the predetermined height may comprise attaching lighter-than-air balloons to the boom for lifting the boom into the air, and attaching a towline to the boom for restraining the boom to the reference point.

According to a third aspect of the present invention, there is provided a method for recovering a UAV, the method comprising the steps of:

lifting the boom of the apparatus as defined in the first aspect to the predetermined height;

controlling the UAV to fly toward the boom between the two arm members of the boom; and capturing the UAV using the boom.

The step of controlling the UAV to fly toward the boom between the two arm members of the boom may comprise controlling the UAV to fly at a level higher than the boom; and positioning the UAV based on at least one of a Global Positioning System (GPS) signal and a visual indicator.

The step of capturing the UAV using the boom may comprise releasing a line from the UAV, the line being attached to the UAV at one end; capturing the line using a capturing mechanism disposed on the boom; and decelerating the UAV.

The step of releasing the line from the UAV may comprise releasing the line having a weight attached to the other end of the line.

The step of decelerating the UAV may comprise stopping the weight at the capturing mechanism, the UAV being forward of the reference point; and stopping an engine of the UAV based on a tension in the line connecting the UAV and the weight.

The method may further comprise deploying a parachute from the UAV after stopping the engine of the UAV; and retracting a towline attached to the boom to collect the UAV.

According to a fourth aspect of the present invention, there is provided a kit of parts for launch and recovery of a UAV, the kit comprising:

the apparatus as defined in the first aspect;

lifting means adapted to be attached to the boom of the apparatus; and a towline adapted to be attached to the boom at one end to a reference point at the other end.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide devices and methods for the launch and recovery of a UAV in constrained spaces, for example but not limited to, on top of a building, on the deck of a vessel, or a small clearing in the forest. In certain embodiments of the invention, a boom is lifted to a predetermined height and used for launch and recovery of a UAV in relation to a reference point. The lifting means of the boom may be through using balloons and towlines, which are further attached to a winch below. The engine of the UAV is turned on and the boom, with the UAV attached, is positioned in front of the reference point. The UAV is dropped and picks up a predetermined airspeed during the dive to perform a pull-up and continue on its planned flight. Other embodiments of the invention provide a method to capture a UAV using a combination of a line with a weight at one end and a capturing mechanism on the boom. The UAV flies into the boom and the line and weight are guided along by the shape of the boom. The line and weight latches on the capture mechanism of the boom and are secured with a latch. The tension sensor on the UAV senses that the tension of the line is at least equal to a predetermined magnitude and instructs the UAV to stop its engines and deploy a parachute. The parachute decelerates the UAV to a halt and both the boom and the UAV are winched back toward the reference point.

Figure 1:
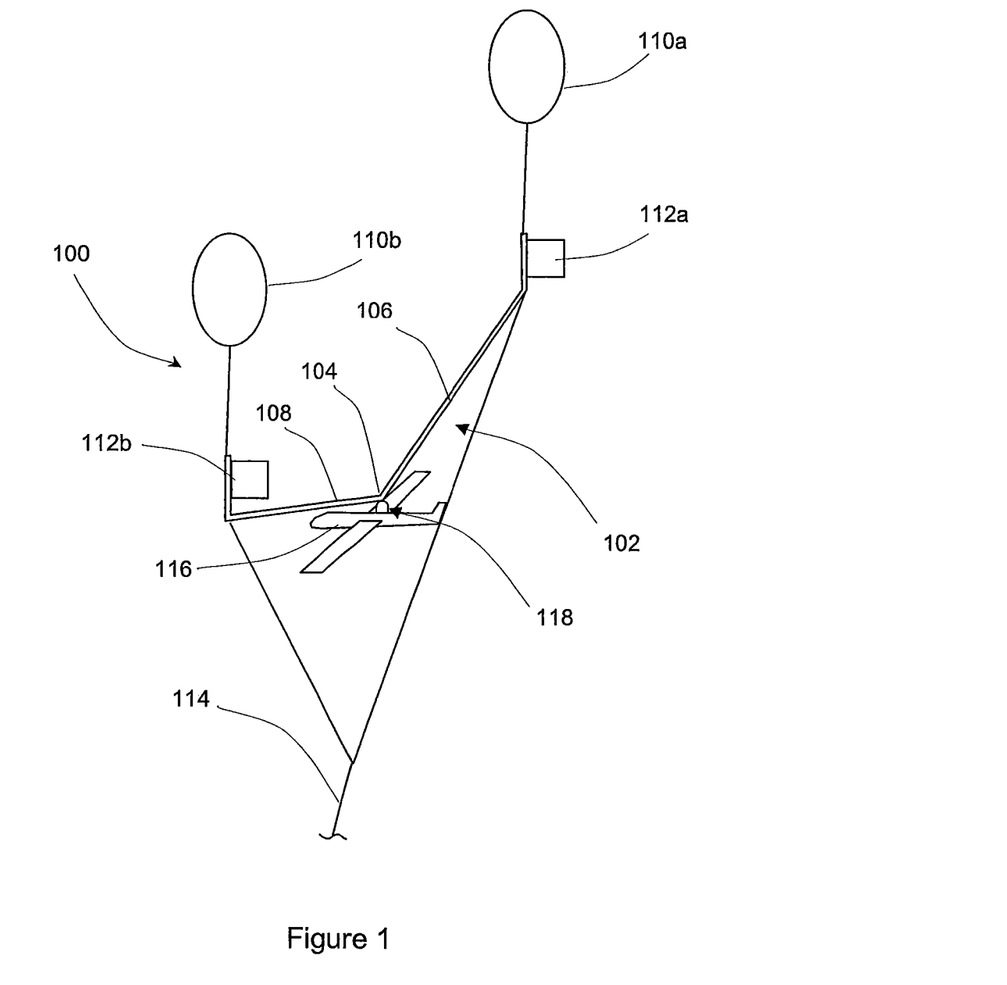
FIG. 1 shows a schematic diagram illustrating a perspective view an apparatus for launch and recovery of a UAV according to an example embodiment.
Figure 2:
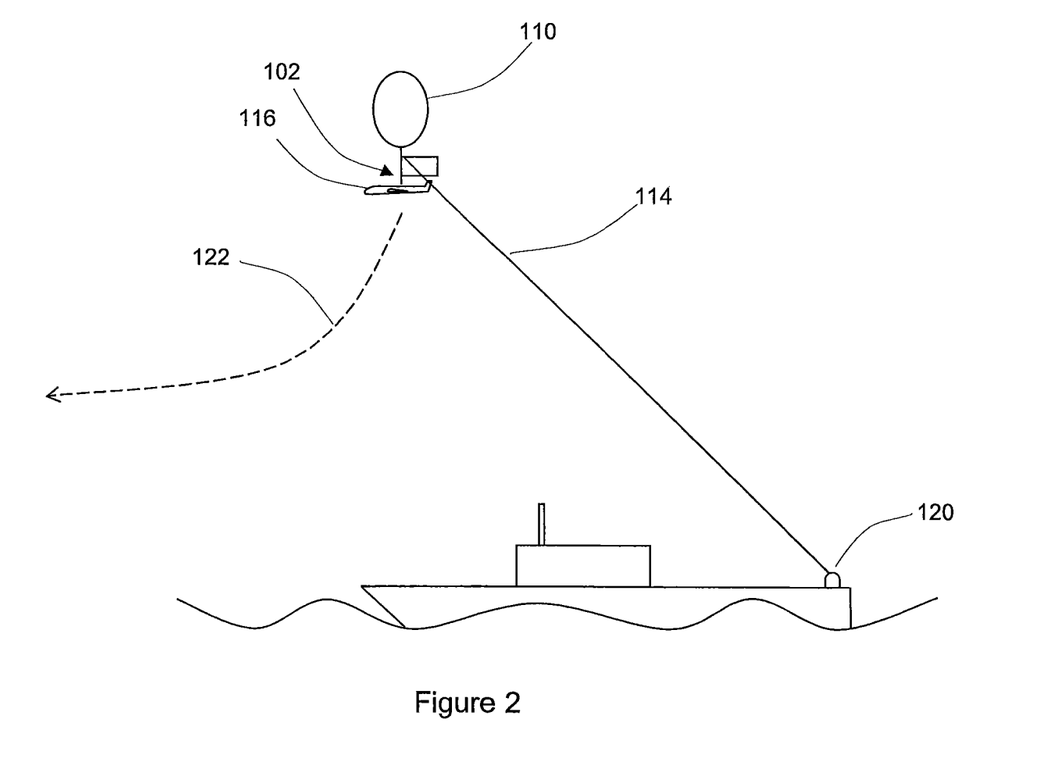
FIG. 2 shows a side view of the apparatus of FIG. 1 during a launch operation.

FIG. 1 shows a schematic diagram of an apparatus 100 for launch and recovery of a UAV. The apparatus 100 comprises a boom 102 for receiving a UAV 116 and lifting the UAV 116 into the air to a predetermined height during launch, and for capturing the UAV 116 during recovery. The boom 102 comprises a center member 104 for receiving the UAV 116, a first arm 106 and a second arm 108 that extend outwardly and upwardly from the center member 104. In an example embodiment, the boom 102 and UAV 116 are lifted into the air by means of lighter-than-air balloons 110a, 110b that are attached to the first arm 106 and the second arm 108 respectively. The size of the balloons 110a, 110b are determined by the mass of the boom 102 and UAV 116 so that adequate lift is provided for the boom 102 and UAV 116 to reach a predetermined height. A towline 114 is configured to be attached to the boom 102 at one end and to a reference point at the other end for restraining the UAV 116 and the boom 102 at the predetermined height. In an example embodiment as shown in FIG. 2, the towline 114 is further attached to a winch 120 (FIG. 2) at the reference point to release or retract the towline 114. The winch 120 is portable and can be used in a variety of applications with minimal logistic and manpower requirements. Examples include deploying the winch 120 on a mobile vehicle, on a vessel, or on top of a building.

In the example embodiment, the center member 104, the first arm member 106 and the second arm member 108 are arranged to form a V-shape. In alternate embodiments, the members can be arranged in the form of an arc, a U-shape or a curve. The members are arranged such that the first arm member 106 and the second arm member 108 are at a distance apart to form a gap to provide sufficient space for ease of capture of the UAV 116 during recovery operations. In the example embodiment, the center member 104 comprises a releasable fastener 118 for attaching the UAV 116 to the boom 102 and to release the UAV 116 during launch operations.

The boom 102 further comprises visual indicators 112a, 112b attached to respective ends of the first arm member 106 and the second arm member 108. Each of the visual indicators 112a, 112b is rotatable about the respective end for aligning it to indicate the wind direction. The visual indicators 112a, 112b also serve as a guide for the vision-based guidance device or UAV pilot during recovery operations. For example, a brightly coloured (e.g. red) visual indicator may enable the vision-based guidance device or UAV pilot to pinpoint both the location of the boom 102 and the wind direction during recovery operations. This assists the vision-based guidance device or UAV pilot to accurately manoeuvre the UAV to the boom 102 with the current wind conditions. In the example embodiment, as shown more clearly in FIG. 6, the center member 104 of the boom 102 further comprises a capturing mechanism in the form of a latch 130 and a biasing member 132 configured to retain a line 126 within the latch 130 during recovery operations.

FIG. 2 shows a side view of the apparatus 100 of FIG. 1 during a launch operation. The UAV 116 is attached to the boom 102 and lifted into the air at a predetermined height by means of lighter-than-air balloons 110. The towline 114 is attached to the boom 102 at one end and to a winch 120 at the other end for releasing and retracting the towline 114 as necessary. In the example embodiment, the winch 120 is attached to the deck of a ship but it will be appreciated that the winch 120 can also be used on other mobile vehicles or vessels and small constrained spaces such as a small clearing in the forest or on the rooftop of a building. During launch, the UAV 116 is attached to the boom 102 and the balloons 110 are inflated. The UAV 116 and boom 102 are lifted by the balloons as shown in FIG. 2. The balloons 110 are typical lighter-than-air balloons, for example, large weather helium-filled balloons which are sometimes used to lift meteorological apparatuses into the atmosphere.

When the UAV 116 reaches a predetermined altitude, calculated from current wind speeds and wind direction, the UAV 116 starts its engine and pulls the boom 102 and balloons 110 forward. The winch 120 on board the ship acts as a reference point during launch operations. When the UAV 116 and boom 102 are in front of the reference point, the UAV 116 is detached from boom 102 by means of the releasable fastener 118 at the center member 104 of the boom 102, as depicted in FIG. 1. Once it is released, the UAV 116 dives along a forward curve 122 to pick up airspeed. On reaching the required airspeed, the UAV 116 pulls up to continue its planned flight. The boom 102 can subsequently be rewound using the winch 120 and be reused at the next launch.

Figure 3:
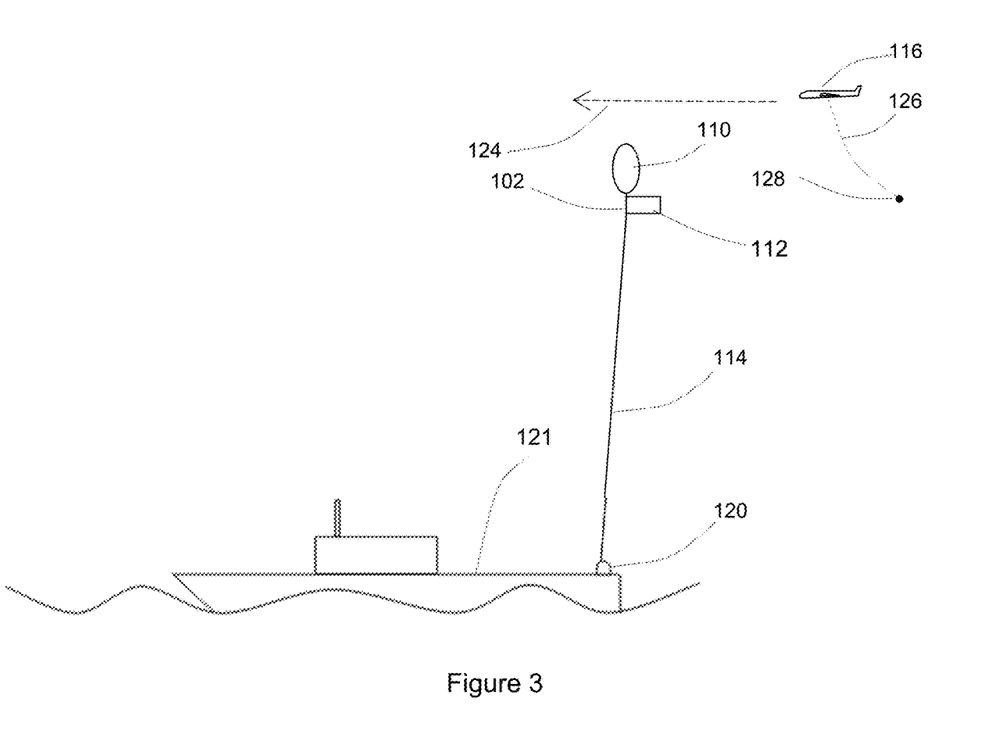
FIG. 3 shows a side view of the apparatus of FIG. 1 during a recovery operation.

FIG. 3 shows a side view of the apparatus 100 of FIG. 1 during a recovery operation. First, the boom 102 is lifted to a predetermined altitude using balloons 110 and restrained using the towline 114 attached to the winch 120 on board a ship 121. The UAV 116 flies along a path 124 towards the boom 102, initially guided by GPS and approaches the boom 102 at a level higher than the boom 102 and balloons 110 and between the two arm members 106, 108 (FIG. 1) of the boom 102. When the boom 102 and the balloons 110 appear in the field of view of the forward looking UAV payload camera, precision vision guidance is activated automatically. The vision-based guidance device (not shown) or UAV pilot guides the UAV 116 to approach the boom 102 under the combined guidance of GPS and vision from the visual indicators 112 attached to the ends of the boom 102. When the UAV 116 is at a predetermined distance to the boom 102, a line 126 with a tethered weight 128 at one end is deployed from the UAV 116. The line 126 is preferably made from materials strong enough to sustain impact forces experienced during abrupt deceleration of the UAV 116 during recovery operations. It is also slim enough to enter the latch 130 (FIG. 5) of the capturing mechanism on the center member 104 of the boom 102 and is able to slide up and down freely. The weight 128 is typically made of a metallic material such as steel or lead and is larger in size than the latch 130 of the capturing mechanism.

Figure 4:
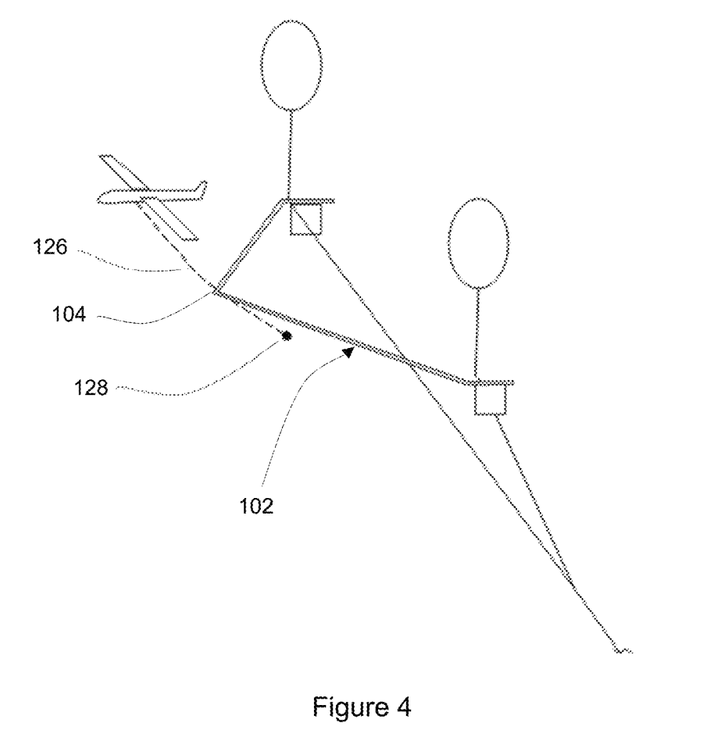
FIG. 4 shows a close-up perspective view of the apparatus of FIG. 1 during a recovery operation.
Figure 5:
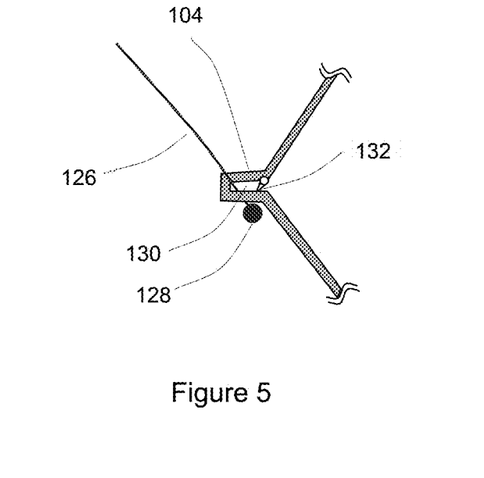
FIG. 5 shows a perspective view illustrating an example capturing mechanism of the apparatus of FIG. 1.
Figure 6:
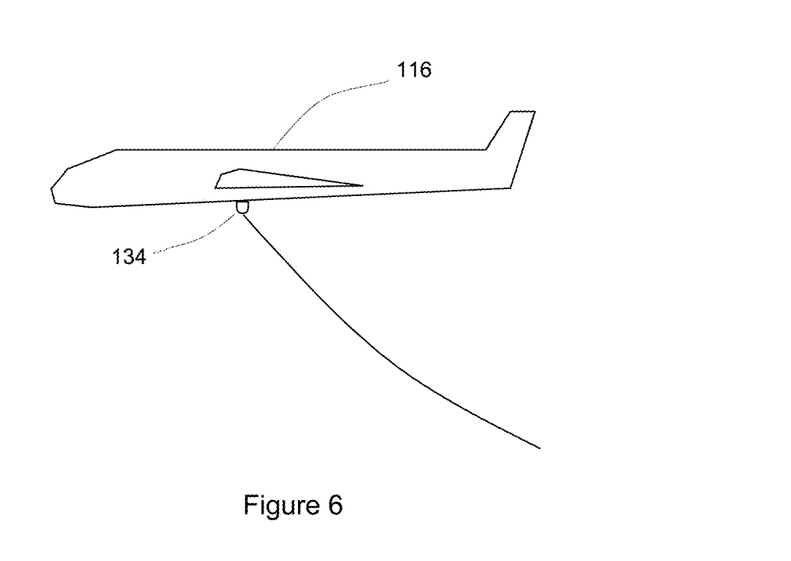
FIG. 6 shows a side view of the UAV illustrating a weighted line and a tension sensor on the UAV.
Figure 7:
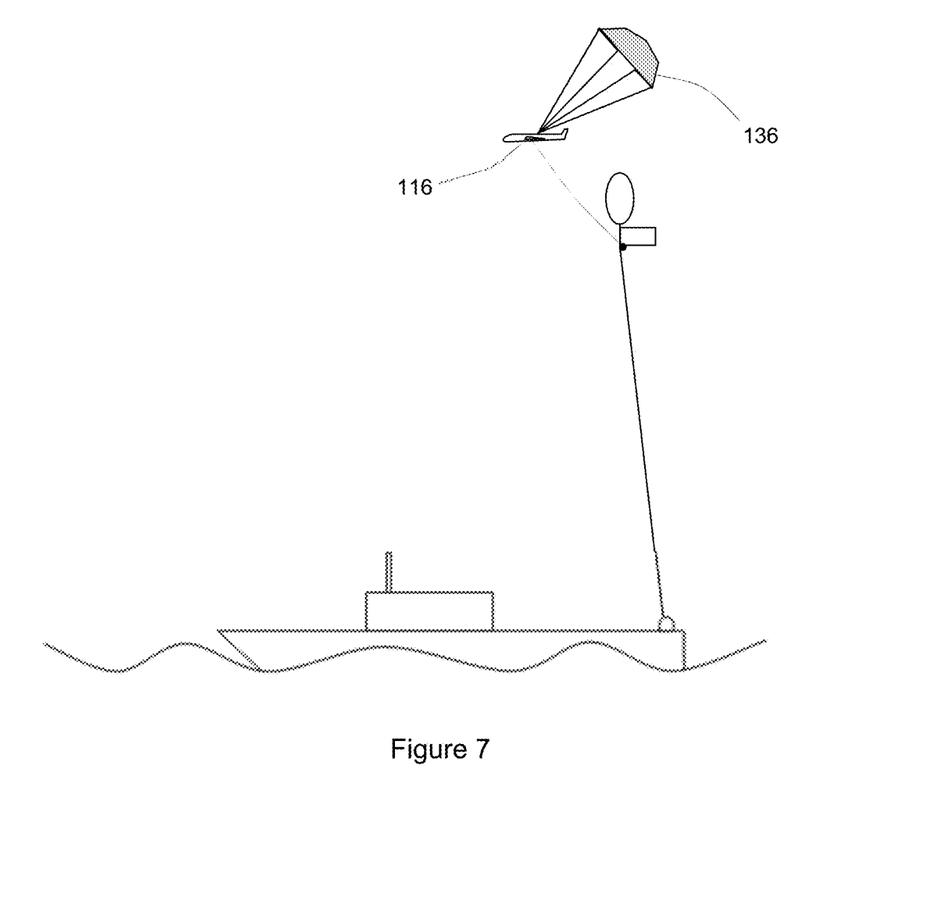
FIG. 7 shows a schematic diagram illustrating a side view after the parachute on the UAV is deployed during a recovery operation.
Figure 8:
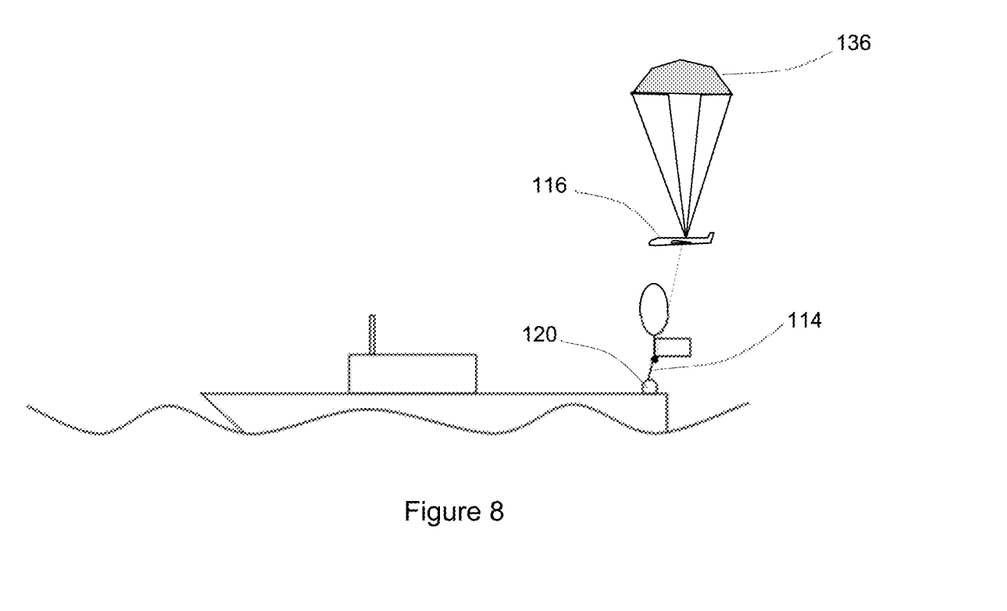
FIG. 8 shows a schematic diagram illustrating a side view of the captured UAV being winched back towards a ship during a recovery operation.

As shown in FIG. 4, when the line 126 with a tethered weight 128 contacts the boom 102, the line 126 is guided along by the shape of the boom 102 and slides into the capturing mechanism disposed at the center member 104 of the boom 102. The line 126 is entrapped in the capturing mechanism, and a biasing member 132 (FIG. 5), such as a one-way spring positioned at the entry point of the capturing mechanism, ensures the line 126 is secured inside the capturing mechanism, as depicted in FIG. 5. As the UAV 116 continues to fly forward, the line 126 is pulled since the weight 128 is stopped by the capturing mechanism. This is possible because the size of the weight 128 is larger than the slot of the capturing mechanism. Once the weight 128 is stopped by the capturing mechanism and both the UAV 116 and the boom 102 are forward of the reference point at the winch 120, the tension sensor 134 on the UAV 116 as shown in FIG. 6 senses the tension in the line 126. If the tension is at or exceeds a predetermined magnitude, the tension sensor 134 signals the UAV 116 to turn off its engines and deploy a parachute 136 from the UAV 116, as shown in FIG. 7, to decelerate the UAV 116 to a halt. After the parachute 136 is fully deployed, the towline 114 is reeled in by the winch 120 to recover the UAV 116, as shown in FIG. 8.

Figure 9:
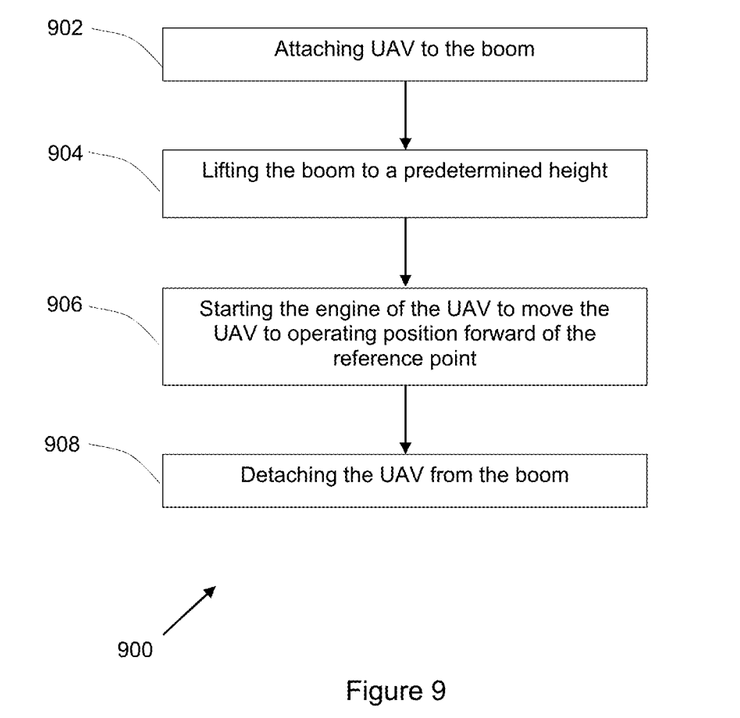
FIG. 9 is a flow chart illustrating a method for launching a UAV according to an example embodiment.

FIG. 9 shows a flow chart 900 illustrating a method for launching a UAV according to an example embodiment. At step 902, the UAV is attached to the boom of the apparatus as described above. At step 904, the boom is lifted to the predetermined height. At step 906, an engine of the UAV is started for moving the UAV to the operating position forward of the reference point. At step 908, the UAV is detached from the boom.

Figure 10:
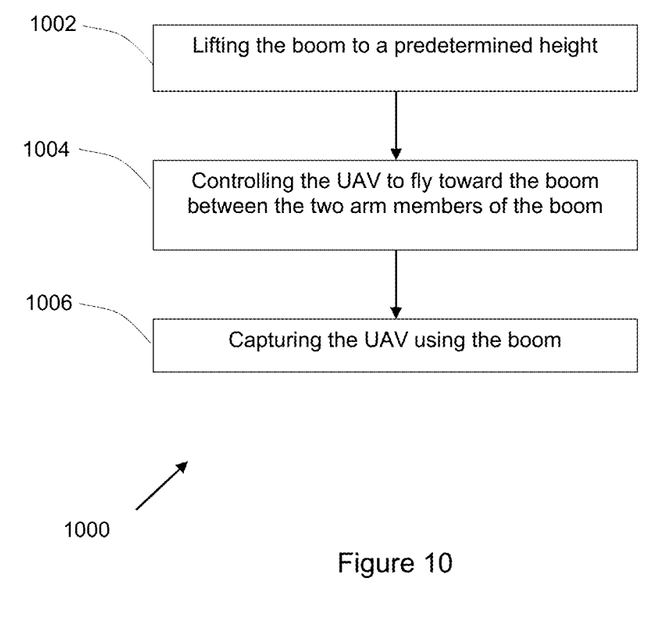
FIG. 10 is a flow chart illustrating a method for recovering a UAV according to an example embodiment.

FIG. 10 shows a flow chart 1000 illustrating a method for recovering a UAV according to an example embodiment. At step 1002, the boom of the apparatus as described above is lifted to the predetermined height. At step 1004, the UAV is controlled to fly toward the boom between the two arm members of the boom. At step 1006, the UAV is captured using the boom.

The present invention provides an apparatus and a method for launch and recovery a UAV that may overcome the problems of the previous systems. As described above, it provides a method of launching and recovering a UAV without the need for large open spaces. Lighter-than-air balloons are used to lift the UAV to the sky smoothly and the selection of a launch site is not limited by the wind direction or the size of the open area. The recovery system also captures UAVs with a boom which is lifted in the sky using lighter-than-air balloons. Advantageously, the danger of crashing UAVs into nearby structures during recovery is substantially reduced or eliminated. The apparatus and method as described also require little space to operate, allowing the UAVs to be used in operations which have constrained launch and recovery space, such as on board a ship, in a small clearing in the forest or on the rooftop of a building.

In the example embodiments, the positioning of the boom forward of the reference point ensures that the UAV does not impact on neighboring structures such as a ship's mast or antennas during drop and airspeed pick up, avoiding serious damage to both the UAV and the ship. Furthermore, the forward position of the boom allows direct visual contact of the UAV at all times. The release of the UAV in front of the reference point on the ship can also avoid any air turbulence that is behind the ship's structure and decreases the possibility of diversion of the intended flight path.

Further, the same boom is used for both launch and recovery, making the apparatus of the example embodiments more cost effective than other systems. In addition, the system is easier to maintain through the usage of simple-yet-functional devices such as a latch, towline and balloons. Heavy modification of the surface vessel is also not required as most ships are already fitted with a winch for sea-side rescue operations.

The shape of the boom is designed to allow easy navigation of the UAV and to reduce pilot training. During recovery operations of the UAV, the weight is guided along the sides of the boom into the capturing mechanism, thereby reducing the need for precision guidance of the vision-based guidance device or UAV pilot, as present in other prior art systems. Visual indicators on the boom further assist the vision-based guidance device or UAV pilot into easy maneuvering of the UAV into the boom.

The latch of the capturing mechanism at the center member of the boom provides a simple and robust solution of capturing a UAV without the need for complicated modification or design of the boom. Once the line and weight slides into the capture mechanism, the weight is firmly secured to the boom, as the size of the weight and the biasing member on the capture mechanism ensure that the weight is retained in the latch.

The tension sensor on the UAV senses whether the tension in the line is at or exceeds a predetermined magnitude, and subsequently activates the parachute and stops the engine to decelerate the UAV to complete rest, thereby reducing the inertia forces when stopping the UAV which may damage the UAV or the boom.

Launch and recovery of the UAV can be accomplished at varying altitudes to avoid fog or clouds and can be deployed within a short period of time. This is possible because of the simplicity of the design of the apparatus and method used for launch and recovery operations.

The altitude required for UAV launch according to the example embodiments may be lower compared to existing systems. The engine of the UAV has already started before it is detached from the boom. The airspeed required for pickup during dive will be less than when it is at rest. This will result in a lower altitude required for launch of the UAV.

It can also be shown that embodiments of the present invention require little logistical resources and man power for launch and recovery. The boom and the balloons are easily recoverable and can be reused for the next operation. The boom, balloons, towline, etc. can be packaged in a portable kit for transportation and deployment. The usage of the tension sensor and parachute can impose less damage to the UAV and the structure of the boom requires less UAV precision control by the vision-based guidance device or pilot.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An apparatus for launch and recovery of an Unmanned Aerial Vehicle (UAV), the apparatus comprising:
   a boom having a center member for receiving the UAV, and first and second arm members extending outwardly and upwardly from the center member;
   lifting means attached to the first and second arm members for lifting the UAV to a predetermined height; and
   a towline configured to be attached to the boom at one end and to a reference point at the other end for restraining the UAV to the reference point;
   wherein the center member comprises a capturing mechanism for aerial recovery of the UAV;
   wherein the boom is configured to be lifted to the predetermined height into the air from the reference point; and
   wherein the boom is movable in the air to an operating position forward of the reference point.

2. The apparatus as claimed in claim 1, wherein the center member comprises a releasable fastener for attaching the UAV to the boom and releasing the UAV for aerial launch.

3. The apparatus as claimed in claim 1, wherein the capturing mechanism comprises a latch configured to receive a line attached to the UAV.

4. The apparatus as claimed in claim 3, wherein the latch comprises a biasing member configured to retain the line within the latch.

5. The apparatus as claimed in claim 1, further comprising first and second visual indicators attached to respective ends of the first and second arm members.

6. The apparatus as claimed in claim 5, wherein each visual indicator is rotatable about the respective end for aligning the visual indicator with a wind direction.

7. The apparatus as claimed in claim 1, wherein the center member and first and second arm members form a shape selected from a group consisting of a V-shape, a U-shape, a curve, and an arc.

8. The apparatus as claimed in claim 1, wherein the lifting means comprise lighter-than-air balloons.

9. The apparatus as claimed in claim 1, further comprising a winch disposed at the reference point for releasing or retracting the towline.

10. A method for recovering a UAV using the apparatus as claimed in claim 1, the method comprising the steps of:
    lifting the boom of the apparatus to the predetermined height;
    controlling the UAV to fly toward the boom between the two arm members of the boom; and
    capturing the UAV using the boom.

11. The method as claimed in claim 10, wherein the step of controlling the UAV to fly toward the boom between the two arm members of the boom comprises:
    controlling the UAV to fly at a level higher than the boom;
    positioning the UAV based on at least one of a Global Positioning System (GPS) signal and a visual indicator.

12. The method as claimed in claim 10, wherein the step of capturing the UAV using the boom comprises:

releasing a line from the UAV, the line being attached to the UAV at one end;
capturing the line using a capturing mechanism disposed on the boom; and
decelerating the UAV.

13. The method as claimed in claim 12, wherein the step of releasing the line from the UAV comprises releasing the line having a weight attached to the other end of the line.

14. The method as claimed in claim 13, wherein the step of decelerating the UAV comprises:
stopping the weight at the capturing mechanism, the UAV being forward of the reference point; and
stopping an engine of the UAV based on a tension in the line connecting the UAV and the weight.

15. The method as claimed in claim 14, further comprising:
deploying a parachute from the UAV after stopping the engine of the UAV; and
retracting a towline attached to the boom to collect the UAV.

16. A kit of parts for launch and recovery of an UAV, the kit comprising:
the apparatus as claimed in claim 1;
lifting means adapted to be attached to the boom of the apparatus; and
a towline adapted to be attached to the boom at one end and to a reference point at the other end.

17. A method for launching a UAV using the apparatus as claimed in claim 1, the method comprising the steps of:
attaching the UAV to the boom of the apparatus;
lifting the boom to the predetermined height;
starting an engine of the UAV for moving the UAV to the operating position forward of the reference point; and
detaching the UAV from the boom.

18. The method as claimed in claim 17, wherein the step of lifting the boom to the predetermined height comprises:
attaching lighter-than-air balloons to the boom for lifting the boom into the air;
attaching a towline to the boom for restraining the boom to the reference point.

* * * * *